US009515940B2

(12) United States Patent
Nöbauer et al.

(10) Patent No.: US 9,515,940 B2
(45) Date of Patent: Dec. 6, 2016

(54) METHOD FOR TRANSMITTING DATA IN A PACKET-ORIENTED COMMUNICATIONS NETWORK AND CORRESPONDINGLY CONFIGURED USER TERMINAL IN SAID COMMUNICATIONS NETWORK

(71) Applicants: Josef Nöbauer, Neukirchen-Balbini (DE); Helge Zinner, Magdeburg (DE)

(72) Inventors: Josef Nöbauer, Neukirchen-Balbini (DE); Helge Zinner, Magdeburg (DE)

(73) Assignee: Continental Automotive GmbH, Hannover (DE)

( * ) Notice: Subject to any disclaimer, the term of this patent is extended or adjusted under 35 U.S.C. 154(b) by 2 days.

(21) Appl. No.: 14/400,498

(22) PCT Filed: May 8, 2013

(86) PCT No.: PCT/EP2013/059646
§ 371 (c)(1),
(2) Date: Nov. 11, 2014

(87) PCT Pub. No.: WO2013/167690
PCT Pub. Date: Nov. 4, 2013

(65) Prior Publication Data
US 2015/0124600 A1    May 7, 2015

(30) Foreign Application Priority Data

May 11, 2012    (DE) .................. 10 2012 207 929

(51) Int. Cl.
*H04L 12/851*    (2013.01)
*H04L 12/26*    (2006.01)
(Continued)

(52) U.S. Cl.
CPC ........... *H04L 47/24* (2013.01); *H04L 43/0852* (2013.01); *H04L 47/724* (2013.01); *H04L 47/822* (2013.01); *H04L 43/0876* (2013.01); *H04L 43/106* (2013.01); *H04L 47/564* (2013.01)

(58) Field of Classification Search
None
See application file for complete search history.

(56) References Cited

U.S. PATENT DOCUMENTS

| 6,888,831 | B1 * | 5/2005 | Hospodor ........... H04L 12/5695 370/394 |
| 8,064,356 | B1 | 11/2011 | Krzanowski et al. |
| 2003/0182594 | A1 * | 9/2003 | Watkins ................ H04L 1/22 714/11 |

FOREIGN PATENT DOCUMENTS

| EP | 1 211 851 | 6/2002 |
| EP | 1 548 980 | 6/2005 |

(Continued)

OTHER PUBLICATIONS

Shimonishi et al. "Performance Analysis of fast Reservation Protocol with Generalized Bandwidth Reservation Method", Mar. 24, 1996, pp. 758-767.*

(Continued)

*Primary Examiner* — Huy D Vu
*Assistant Examiner* — James P Duffy
(74) *Attorney, Agent, or Firm* — Cozen O'Connor (57) ABSTRACT

A method for transmitting data in a packet-oriented communications network, in particular of a motor vehicle, with a guaranteed maximum transmission time for the data packets in the communications network, and to a user terminal in the communications network. In the method, a specific quality of service as a capacity of the communication link is reserved prior to a data transmission by a reservation request from the sender of the data to the receiver of the data and the requested quality of service as a capacity of the communication link between the sender and the receiver is guaranteed in the network for the data stream by the confirmation of the reservation request, or an indication is given by a rejection that transmission is not possible. In addition, the capacity of the communications network is determined cyclically prior to a reservation request, after a rejection and/or at predefinable time intervals.

11 Claims, 3 Drawing Sheets

(51) Int. Cl.
*H04L 12/913* (2013.01)
*H04L 12/911* (2013.01)
*H04L 12/875* (2013.01)

(56) References Cited

FOREIGN PATENT DOCUMENTS

| EP | 2 247 037 | 11/2010 | |
|---|---|---|---|
| SE | EP 1211851 A1 * | 6/2002 | ......... H04L 12/5695 |
| SE | WO 2009054769 A1 * | 4/2009 | ............ H04L 12/12 |
| WO | WO 01/82022 | 11/2001 | |
| WO | WO 2009/017933 | 2/2009 | |
| WO | WO 2009/023838 | 2/2009 | |

OTHER PUBLICATIONS

Polk, "A Resource Reservation Protocol (RSVP) Extension for the Reduction of Bandwidth of a Reservation Flow", May 1, 2006, 21 pages.

"IEEE P1722™/D2.5 Draft Standard for Layer 2 Transport Protocol for Time Sensitive Applications in a Bridged Local Area Network", Sep. 30, 2010 pp. Cover—54.

"IEEE Standard for Local and Metropolitan Area Networks—Virtual Bridged Local Area Networks: Amendment 14: Stream Reservation Protocol (SRP)", Sep. 30, 2010, 119 pages.

\* cited by examiner

FIG 1

| 1  | Insufficient bandwidth |
| 2  | Insufficient bridge resources |
| 3  | Insufficient bandwidth for class of traffic |
| 4  | Stream ID being used by the other speaker |
| 5  | Stream destination address in use |
| 6  | Earmarked stream due to higher rank |
| 7  | Reported latency time has changed |
| 8  | Output port not AVB-capable |
| 9  | Use other destination address (MAC DA hash table full) |
| 10 | Outside the MSRP resources |
| 11 | Outside the MMRP resources |
| 12 | Cannot store the destination address (bridge outside of MAC DA resources) |
| 13 | Requested priority is not an SR class (3.3) priority |
| 14 | Max frame size (35.2.2.8.4(a)) too large for media |
| 15 | msrp(MacFanInPorts (35.2.1.4(f)) limit reached |
| 16 | Change in first value for registered stream ID |
| 17 | VLAN blocked at output port (registration prohibited) |
| 18 | VLAN detection blocked at this output port |
| 19 | SR classes priorities discrepancy |

METHOD FOR TRANSMITTING DATA IN A PACKET-ORIENTED COMMUNICATIONS NETWORK AND CORRESPONDINGLY CONFIGURED USER TERMINAL IN SAID COMMUNICATIONS NETWORK

CROSS REFERENCE TO RELATED APPLICATIONS

This is a U.S. national stage of application No. PCT/EP2013/059646, filed on May 8, 2013. Priority is claimed on German Application No.: DE102012207929.7, filed May 11, 2012, the content of which are incorporated herein by reference.

BACKGROUND OF THE INVENTION

1. Field of the Invention

The invention relates to a method for transmitting data in a packet-oriented communication network having a guaranteed maximum transmission time for the data packets in the communication network and to a user terminal configured for participation in the communication. The communication network (also called network in brief) is, in particular, the communication network of a motor vehicle, for example a network according to the Ethernet AVB standard.

According to one embodiment of the invention, a specific quality of service as a capacity of the communication link is reserved prior to a data transmission by a reservation request from a sender of data to one or more receivers of the data. The request for quality of service as a capacity of the communication link between sender and receiver in the network is guaranteed for the datastream with a confirmation of the reservation request. Alternatively, an indication is given by a rejection of the reservation request that a data transmission is not possible.

In particular, the rejection can contain an error code such as, for example, an information "inadequate data rate". Usually, and corresponding to the standard, this does not however contain a status message about the network and, in particular, the data rate still available in the network.

2. Description of the Prior Art

Usually, the data is forwarded in a datastream coming from the sender over further user terminals of the network, so-called switches, to the receiver(s). This also applies to the reservation request, the sender receiving a confirmation coming from the receiver when the reservation request arrives at the receiver with a positive assessment by the switches forwarding the datastream and the receiver being capable of and ready for receiving and processing the requested datastream. The receiver then actively sends out a confirmation which can be conducted back to the sender via the switches.

The rejection following a reservation request can come from the nominal receiver(s) of the datastream when they cannot or do not want to process the data. On the other hand, a rejection following the reservation request can also be effected by one of the interconnected switches provided for forwarding the data packets when it can currently not provide the requested quality of service, especially the requested data rate and latency. The reservation request can therefore comprise as parameter of the requested quality of service, in particular, the data rate of the datastream and/or its latency, i.e. the maximum transmission time from the sender to the receiver, for example in the form of a requested type of data, apart from possibly still other parameters. The available data rate and/or latency, in particular, will also be called capacity in brief in the context of the invention following.

For the use in a motor vehicle, the new Ethernet AVB standard (IEEE 802.1 BA) is examined with increasing interest which, in contrast to a conventional (normal) standard Ethernet can guarantee a maximum transmission time of data packets (latency). Ethernet AVB data are transmitted as data packets, for example according to IEEE 1722 or the IEEE 1733 transport protocol.

However, before the actual data transmission can begin, a certain quality of service (particularly latency and data rate, also generalized called capacity in the text which follows) is reserved by a reservation request from the sender to one or more receivers, which is forwarded via switches in the communication network if there is no direct link between sender and receiver.

For this purpose, reservation requests are transmitted according to an MSRP (Multiple Stream Reservation Protocol) protocol from the sender, also called talker, to the receiver(s) called listener(s), a maximum of six switches are allowed to be interposed between sender and receiver in order to maintain the latency of the class requested in each case. The network link between two user terminals is called Hop.

Apart from the magnitude of the datastream, the reservation requests usually also contain their transmitting frequency and a so-called AVB class, two classes A and B being provided in accordance with the aforementioned standard. In class A, a maximum transmission time (latency) from the sender to the receiver of 2 ms is guaranteed; these are 50 ms in class B.

When the receiver expects or requests data, it can send out a request to the sender that it wishes to receive a datastream. Like the entire communication between receiver and sender, this request is forwarded to the sender by the switches.

The sender thereupon sends the aforementioned reservation request, which can also be considered as a streaming offer and contains parameters such as the AVB class (also called QoS class—quality of service), the data rate, the rank in the sense of an importance or priority of the message and/or the transmitting frequency. In forwarding the reservation request, the switch checks whether it can still provide these resources in the communication network and, in the case of a positive test, forwards, the message to the receiver or, respectively, in the direction of the receiver to the next switch. The latter responds to the offer and sends back a confirmation.

All switches on the path from the sender to the receiver register the datastream to be transmitted and reserve the necessary quality of service (QoS) via adjustments in their internal queues and registers. If the sender receives a positive return message, the datastream can be transmitted. The datastream is allocated the requested quality of service (QoS). This ensures, inter alia, a defined maximum delay of the datastream during the transmission between the sender and the receiver.

If a reservation cannot be confirmed positively, the sender sending out the reservation request receives a message with a rejection of the reservation request, which usually also contains an error code. Although the error codes provide information about the reason of the rejection which, in a frequent regular case may well be an inadequate capacity, especially an inadequate data rate, they do not provide information about the status of the network for example, the data rate still available.

Thus, there is no possibility of adapting the reservation request selectively to the network to obtain a positive confirmation of the reservation request and to be able to transmit the data speedily in the communication network.

WO 01/82022 A2 discloses an analysis of a network performance in which a number of data packets of a datastream are sent out between network users and an arrival characteristic of each data packet is recorded. By comparing the arrival characteristic of the various data packets, the variability of the data transmission in the network is determined. In these contexts, losses of packets or changes of the transmission time can be investigated, using non-synchronized network users as a basis. However, data rate guarantees cannot be checked by means of this method.

EP 2 247 037 A1 discloses a communication system having a guaranteed data rate in which a data rate reservation request is sent out by an end-point device by interposed switches forwarding the reservation request to the receiver. The switches forward the reservation request in each case in the direction of the terminal if they can meet the data rate request. The reservation request is then sent back by the terminal. This indicates that the data rate reservation is concluded and the data transmission can begin. Otherwise, the data rate reservation request is sent back by the switch which cannot serve the request. This indicates that communication with the requested data rate is not allowed. As an alternative, it is then possible to allow the communication with a reservable data rate or to carry it out as best as possible.

For this purpose, the data rate reservable by the switch is returned as value. With a value of 0, no data rate is reserved and guaranteed but the communication is allowed. The communication is carried out as best as possible. For the method proposed here, however, it is necessary that the switches themselves have considerable logic which makes them expensive and therefore uninteresting for applications in the automobile field. Such a solution is also not compatible with the Ethernet AVB standard.

SUMMARY OF THE INVENTION

It is an object of the invention to check the capacity of the network with simply configured user devices of a communication network of the type mentioned initially, particularly within the bounds of the Ethernet AVB standard.

According to one embodiment of the invention the capacity of the communication network is determined cyclically prior to a reservation request, after a rejection and/or at predefinable or predefined time intervals, i.e. repeated at fixed or adaptable time intervals, preferably by a sender of the data. After the determination of the capacity of the communication network, the sender knows the current capacity of the network. This can be taken into consideration directly when sending out a reservation request so that there is a high probability of a positive confirmation and smooth communication or transmission of the data, respectively. Overall, this is frequently quicker than making a reservation request with maximum requirements for the quality of service of the transmission path which is then rejected.

According to one embodiment of the method proposed according to the invention, the capacity of the communication network is determined by sending out at least one reservation request having a selected capacity by the sender. This means that the reservation requests, in particular, has information on the data rate of the datastream and a latency in the sense of a maximum transmission time of a data packet. This information can be provided, for example, also in the form of a data rate. In the case of a confirmation, a normal reservation request for the datastream can then be resent directly. In the case of a rejection of the reservation request for determining the capacity of the communication network, in contrast, the sender receives information on whether a particular capacity is possible or not.

Sending out this reservation request provided as a standard for datastreams also for procuring information on the capacity of the network is the simplest type of determining the capacity. If the requested capacity is not available, the sender can reduce the requirement for quality of service so that now only a lesser capacity of the communication network is claimed for the datastream. To achieve the fastest possible data transmission after a rejection, a reservation request for a real datastream can be made with a lower requested data rate and/or latency, wherein the reduction of data rate and/or latency (or other capacity demands on the communication network) can be arranged on the basis of empirical values in such a manner that a transmission of the data is then usually possible directly.

According to one embodiment a number of reservation requests comprising different selected capacities can also be sent out until there is a confirmation of the reservation requests (sent out for determining the capacity), the values of the selected capacities being reduced in selectable or selected steps after reception of a rejection. According to one embodiment of the invention, the determination can also be iterative in such a manner that the boundary between a rejection and a confirmation is searched for. For this purpose, after receiving a confirmation, an increase of the capacity selected by the sender to a value between the capacity of the confirmation just obtained and the capacity of the, particularly last, preceding rejection can be set so that the boundary of the capacity available in the communication network is found during a normal iteration.

In order not to unnecessarily load the communication network by the reservation request for determining the capacity, the reservation request for the datastream can be retracted again after receiving a confirmation. This is done typically by sending out a cancellation message, which then immediately releases the resources in the communication network that had been previously reserved in the switches, senders and receivers along the communication link (or by the communication network). Since the reservation requests for determining the capacity of the communication network are a simulation of a real reservation request, the loading of the communication network can be reduced distinctly in this manner by real data traffic.

As a development of the method proposed according to one embodiment of the invention, the reservation requests for determining the capacity of the communication network can be sent with an identifier, for example a flag in the header of the data packets, which identifies the reservation request as a request for determining the capacity, for example by specifying a low, preferably the lowest priority possible in the standard, for the requested transmission. This, too, contributes to the fact that the reservation request for determining the capacity of the network loads the communication network as little as possible since, due to its lower priority, it does not lead to a rejection of real reservation requests for important datastreams which are requested with a higher priority (rank in the reservation request).

It can also be provided, according to one embodiment of the invention, that the sender takes into consideration the capacity of the communication network determined previously or last, i.e. currently, in a reservation request preferably by checking whether the capacity requested for the transmission of the data in the reservation request is greater than a capacity value derived from the determined capacity and the requested capacity possibly, (i.e. if it is greater than the derived capacity value) is reduced so that the requested capacity does not exceed the derived capacity value determined. Preferably, it can even be less than the determined capacity of the communication network, for example lower by a certain percentage or a capacity reserved predefined in magnitude so that the capacity of the communication network is not fully exhausted. This is because operating the communication network at the limit of capacity (which does not need to correspond to the maximum capacity) frequently leads to communication problems.

According to one embodiment of the invention a datastream, the contents of which are data packets having a priority consisting of the sum of the current time on sending of the datastream plus a predeterminable time interval and that the processing time is compared with the time entry in the receiver, the receiver sending back an error message if the processing time is after the time entry in time, can be sent out from the sender to the receiver to determine the actual capacity and/or verify the determined capacity, in particular also to determine the actual latency. It is possible to check the assured maximum transmission time in the communication network and to determine if the actual transmission time is distinctly better than the guaranteed maximum transmission time.

Within the context of this execution of the method proposed according to one embodiment of the invention, a datastream having a number of packets is sent out, the predefinable time interval being varied in the various data packets, preferably between a minimum and a nominal latency period, beginning, for the sake of simplicity, with the nominal latency period, i.e. the guaranteed maximum transmission time, and in time intervals then becoming shorter. Preferably, a number of cycles of a sequence of changing, preferably shortening time intervals can be sent out as part of the datastream for determining the actual capacity or verifying the capacity determined, respectively.

In principle, it would naturally be possible in one embodiment of the invention to send back a positive confirmation in each case when the latency time can be maintained. However, it is advantageous in communication, in order to avoid unnecessary data traffic in the communication network if such return messages only occur in the case of an error and the request is begun with the nominal latency time, i.e. the guaranteed maximum transmission time which is maintained typically in networks.

According to one embodiment of the invention a user terminal in a communication network, particularly a motor vehicle can be, especially, a sender, a receiver, and/or switch of the communication network, comprising a transmitting/receiving device and a computing unit, the computing unit being configured for performing communication in the communication network in accordance with a communication protocol. According to one embodiment of the invention, the computer unit is also configured for performing the method described above or parts thereof by program code.

Correspondingly, the invention also relates to a suitable computer program product comprising program code suitable for configuring the latter, on a computing unit, when executed for performing the method described above or parts thereof, the computing unit, in particular, being the computing unit of a user terminal.

BRIEF DESCRIPTION OF THE DRAWINGS

Other advantages, features and possible applications of the present invention are also obtained from the subsequent description of exemplary embodiments and the drawing. In this context, all features described and/or shown pictorially, by themselves or in any combination, form the subject matter of the present invention also independently of their combination in the claims or their references. In the figures:

DETAILED DESCRIPTION OF THE PRESENTLY PREFERRED EMBODIMENTS

Figure 1:
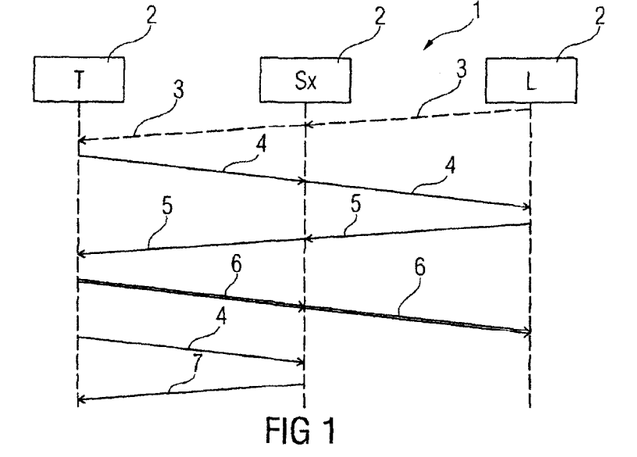
FIG. 1 is a course of the communication comprising a reservation request in a communication network.

FIG. 1 shows a packet-oriented communication network according to the invention, which operates in accordance with the Ethernet AVB standard, in a diagrammatic representation. In the network 1, there are various network users 2, also called nodes that communicate with one another. In the communication, data packets are exchanged in accordance with predefined transport protocols, particularly according to the IEEE 1722 or IEEE 1733 standard. In the text which follows, the course of communication is explained by means of FIG. 1 which represents the sequence in time of the communication among the respective user terminals 2, the time being shown as progressing towards the bottom.

In a first optional step, a receiver L, also called listener, as network user 2, can request a datastream from a sender T, also called teller, as network user 2. For this purpose, a datastream request 3 can be sent out by the receiver L which is forwarded via one or more switches Sx to the receiver T.

When the sender T receives such a datastream request, the sender T sends out a reservation request 4 by which a certain quality of service is to be reserved for the planned datastream in the communication network 1. In this context, the reservation request contains, in particular, the required latency (guaranteed maximum transmission time) of the data packets of the datastream. This reservation request is forwarded to the receiver L via the switches Sx, each switch Sx checking whether the capacity of the communication network 1, requested in the reservation request 4, is actually available. For the sake of clarity, only one switch Sx is shown in FIG. 1.

If this is the case, switch Sx forwards the reservation request 4 until it arrives at the receiver L. The latter decides whether it wishes to accept the datastream offered and, after a positive check, sends a confirmation 5 of the reservation request 4 back to sender T via the switches Sx, the switches Sx reserving the corresponding capacity in the communication network 1 in forwarding the confirmation 5. After receiving the confirmation 5, the sender T initiates a datastream 6 which consists of sending out a multiplicity of individual data packets which are forwarded to the receiver L via the switches Sx.

If, in contrast, a switch Sx cannot provide the capacity of the communication network 1 requested in the reservation request 4, for example, it sends out a rejection 7 of the reservation request 4 following a reservation request 4. This is shown in a second communication cycle below the communication cycle previously described in FIG. 1.

The rejection 7 of the reservation request contains an error code which, although it provides information on the reason for the rejection, does not inform about the capacity of the network.

Figure 2:
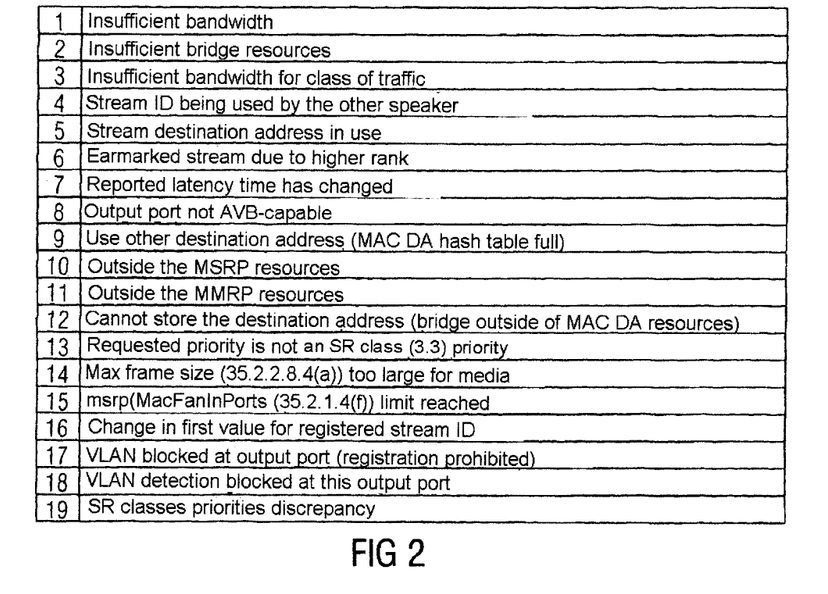
FIG. 2 is an overview comprising possible error messages in the case of a rejection of the reservation request.

An overview of possible error codes is shown in FIG. 2, the error code 1 "insufficient bandwidth", i.e. an inadequate data rate, being a very frequent error code which points to an inadequate capacity of the communication network 1.

However, since this error code does not contain any information about the capacity of the network still available, a subsequent reservation request 4 cannot be adapted to the actual (current) capacity of the communication network 1 in order to obtain a positive confirmation of the reservation request 4 and be able to begin the data transmission.

Although it is possible within the bounds of the standard to receive a confirmation 5 of the reservation request by setting an emergency flag since lower priority reservations can be displaced. This leads to other datastreams possibly being unintentionally interrupted since datastreams marked with the emergency flag necessarily have a higher priority and can delete existing reservations. This may disturb the entire communication process.

Figure 3:
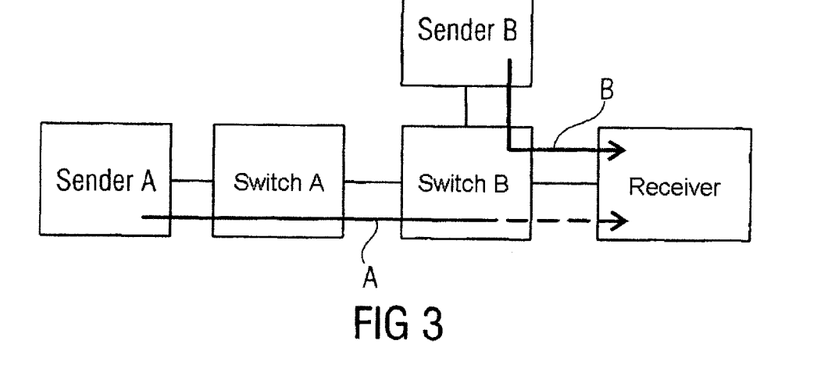
FIG. 3 is the course of a reservation request in the case of inadequate capacity in the communication network.

FIG. 3 shows a reservation sequence with a capacity bottleneck which, in practice, leads to a rejection of a reservation request 4. According to the specification of the Ethernet AVB standard, only 75% of the available data rate can be reserved by reservation requests 4. In the case of a normal 100 Mbit/s network, this therefore corresponds to 75 Mbit/s. In the example shown, two datastreams A and B are provided. Datastream B, which is to be transported to the receiver via switch B starting from sender B, is permanently reserved with a data rate of 60 Mbit/s.

Sometime later, sender A sends a reservation request 4 to the receiver via switches A and B. In the reservation request, sender A wishes to reserve a datastream with the data rate of 16 Mbit/s. In the standard provided according to Ethernet AVB, sender A does not have any information about the datastream B already reserved since the Ethernet AVB does not provide any possibility of determining and distributing in the network the current capacity of the communication network. Sender A thus sends out a reservation request 4 for datastream A in the direction of the receiver. Switch A, which also has no knowledge about the reserved datastream B, responds to the reservation request 4 positively and forwards it in a direction of receiver 4 to switch B. The latter already has a reservation of datastream B and recognizes that a further datastream of 16 Mbit/s (in addition to the datastream of 60 Mbit/s already reserved) would exceed the permitted capacity limit of 75%. Switch B cannot respond positively to the reservation request 4 and sends a rejection 7 of the reservation request 4 back to sender A. This considerably delays the sending out of datastream A since it is now necessary to wait until the required quality for reserving the datastream A is available in the communication network 1.

Figure 4:
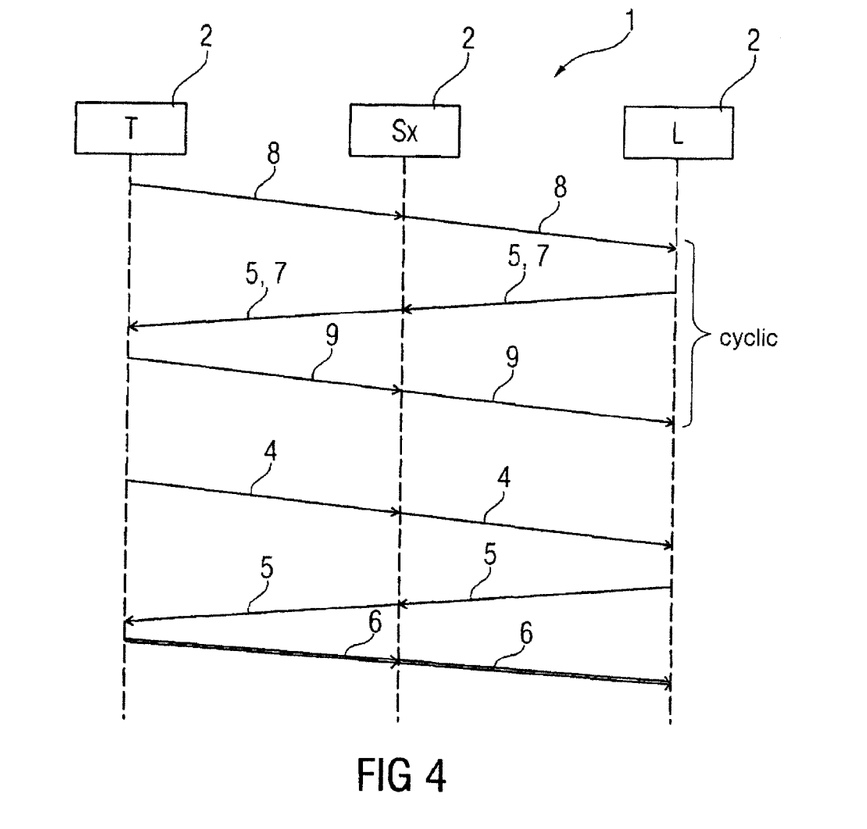
FIG. 4 is diagrammatically a flowchart for the determination of the communication network.

This is addressed by the invention which proposes to determine the current capacity of the communication network 1. For this purpose, the sender T regularly (cyclically) sends out a reservation request 8 for determining the capacity of the communication network, as shown in FIG. 4, even if the sender T does not have any data available for transmission at the current time. As an alternative, such a reservation request 8 for determining capacity can also be sent out when the sender T has received a rejection 7 of a reservation request 4 for a real datastream.

Since the communication network 1 cannot distinguish this reservation request 8 for capacity determination from a normal reservation request 4 for a datastream, sender T correspondingly receives a confirmation 5 or rejection 7 to the reservation request 8. Since there are no data actually to be transmitted behind these reservation requests 8 for capacity determination, these reservation requests 8 for capacity determination thus simulate normal reservation requests 4 (real requests) so that conformation 5 or rejection 7 then provides sender T with information about the remaining capacity of network 1.

Assuming that a request, for example with a data rate of 40 Mbit/s, is rejected, sender T knows that this capacity is currently not available in the network 1. Following this, sender T can send a subsequent reservation request 8 for capacity determination with 35 Mbit/s. It is possible to proceed in this way until the sender T receives a confirmation 5 for its reservation request 8. Sender T then knows that the data rate requested last is currently available in the communication network 1. In this context, the data rate currently available can also be determined.

The process of reservation requests 8 and confirmation 5 or rejection 7 thereof is thus performed cyclically, preferably with varying parameters until the capacity of the network currently available is known to sender T.

In order not to excessively load the network, after a confirmation 5 of a reservation request 8 for capacity determination, a retraction 9 of the reservation request 8 is sent in order to not block the communication network 1 by dummy reservations. Following this, sender T then takes into consideration the currently determined capacity of the communication network in the reservation request 4 of a real datastream 6, requesting a capacity value which is compatible with the status of the communication network currently determined, i.e. within the currently available resources. In this case, it is very probable that the sender T receives a confirmation 5 for its reservation request 4 for a real datastream 6 so that the real datastream 6 can then be sent out.

To avoid the reservation request 8 for capacity determination from impeding real reservation requests 4 of other datastreams which it may not be possible to confirm, it can be ensured by a parameter in the reservation request 8 for capacity determination that parallel real reservation requests 4 for datastreams 6 have priority before the reservation requests 8 for capacity determination.

As a result of the capacity determination, sender T, as possible sender T for the real datastream, thus obtains the capacity of the requested communication link (network path, route) still available. In the assumption that network 1 provides a number of rates to the destination, an alternative path for the data transmission, having the originally desired capacity in an Ethernet AVB network can also be selected with the aid of the results if the quality of service for the data transmission is not to be restricted. The capacity check proposed according to the invention can, therefore, also be used particularly advantageously in conjunction with a route selection (path selection) of the communication and, therefore, represents a so-called layer-2 routing mechanism.

After a positive confirmation 5 for a reservation request 4, 8, a (theoretical) guarantee about the requested quality of service (QoS) exists. In the practical execution of the existing Ethernet AVB standard, however, there is no possibility of verifying this guarantee. If a malfunction deviating from the guarantee of a node or a network user 2, particularly of a switch Sx, occurs, this can have negative effects on the reservation or the flow of communication.

Wireless networks represent an example of fluctuating network characteristics. Due to changing distance between the network users, temporary interfering influences and/or a fluctuating number of users, they offer different qualities of service, in particular different data rates and latencies. Existing reservations can no longer be guaranteed if the network quality drops. This can lead to a complete loss of the reserved connection. The dependence between quality of reception and the available quality of service and the required quality of service is not yet taken into consideration in the current implementation. At the worst, the transmission can even break off in such a case.

It is also desirable to check the actually available capacity of the communication network. A simple possibility of checking preceding reservations is simulating a data packet stream. Each data packet sent according to the IEEE 1722 standard (transport protocol) belongs either to class A (802.1P having priority 3) or to class B (802.1P having priority 2).

To cyclically check an Ethernet AVB communication network 1 including the quality of service (QoS) of the switches Sx for priorities 2 and 3, the loading can be verified by dummy datastreams which trigger the lowest possible network loading. These datastreams are thus those datastreams which are sent by a sender T to a receiver L and only used for diagnosis. The content of the transmitted data is then the current clock time with addition of a time interval, the time preferably being specified in milliseconds. This time, as time entry in the data packet, can be checked with the current processing time in receiver L, an error being reported back if the processing time is temporary after the time contained in the data packet (i.e. after the time of the time entry). By varying the time interval X in different data packets of the datastream, the boundary value can be determined which can guarantee the quality still available.

For example, the time interval could be set to 1 ms. If the transmission time is longer than 1 ms, the receiver detects this by comparing the current clock time and can conclude from this that the time interval of 1 ms cannot be guaranteed. Thus, the current latency of the network can be determined with a corresponding change of the time interval in the data packets and the guarantee of the respective AVB classes A or B can be set more accurately. As a result, the predefined latency can be optimized during the transmission.

As a part of the invention, it is thus proposed to provide, with the aid of the IEEE 1722 transport protocol, corresponding datastreams (frames or data packets) with a timestamp of when the data are to be processed. This timestamp is also called presentation time and is derived from the current clock time synchronous in the AVB network or the AVB cloud, respectively, plus the maximum delay of the quality class. The maximum delay corresponds to the guaranteed maximum transmission time. In the case of class A, the higher-valued AVB streaming class, two milliseconds are then additionally added to each frame. In the case of class B, it is correspondingly 50 milliseconds within which the AVB standard guarantees that a data packet has reached the receiver if it is within the AVB cloud (less than 8 Hops distant).

Due to the synchronization within the AVB network, it is in any case essential that the sender T and the receiver L have the same clock time as reference clock time, and the difference between clocks should be less than 1 µs.

Thus, if data packets arrive at the receiver L, the validity of the presentation time is checked. If the presentation time from the data packet currently received is in the past, the packet has been greatly delayed on its way and thus the quality of the datastream is violated. This can be the starting point for an error treatment. For example, the quality parameters of the transmission can be correspondingly adapted.

Figure 5:
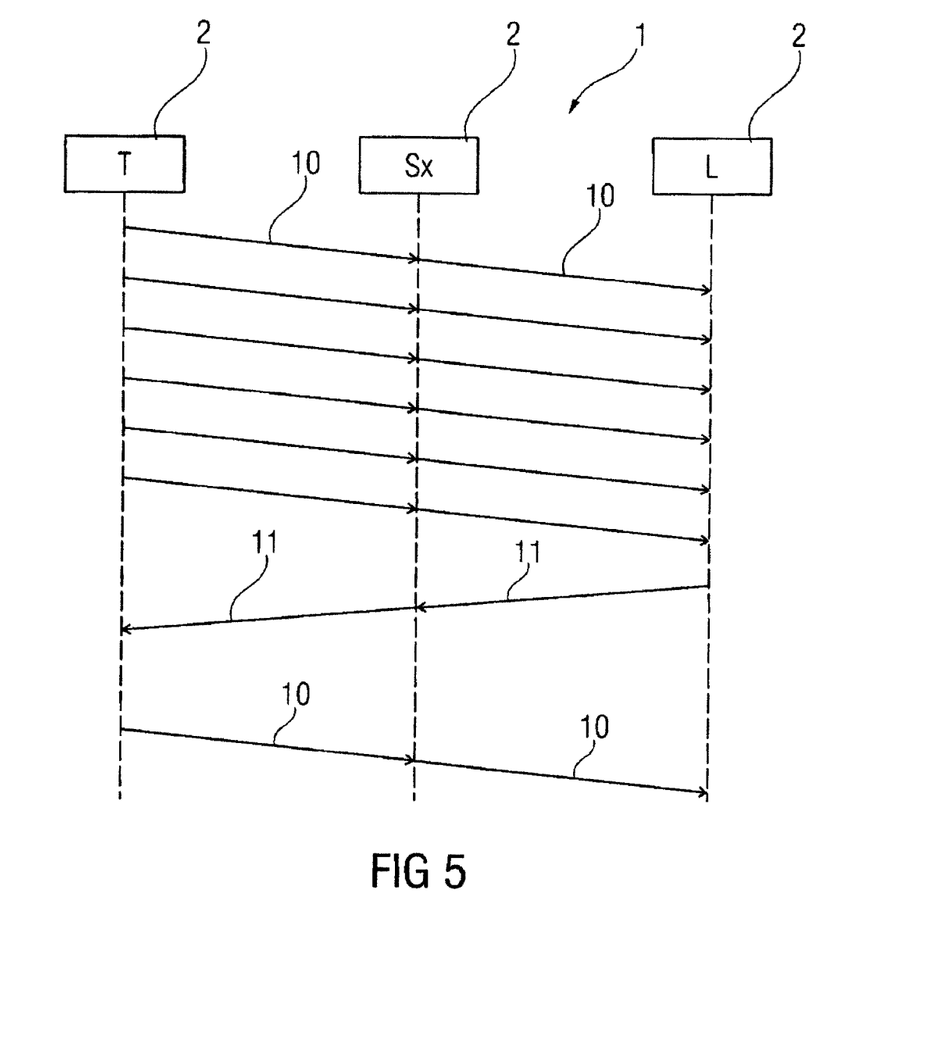
FIG. 5 is a flowchart for the verification of the capacity in the communication network.

This procedure is shown in FIG. 5 in which data packets 10, the content of which consists of a current timestamp plus a predetermined processing time which can be variably adjusted are sent as datastreams for determining the actual capacity. As long as the receiver L receives the data packets 10 earlier than is specified by the timestamp (time entry) of the data packets 10, it does not react. In this case, it can be guaranteed as latency by the additional time interval which had been added to the current clock time. It is only when the processing time in the receiver L is later in time than the timestamp of the data packet 10 of the datastream for determining the actual capacity of the network 1, that an error message 11 is returned. Thus, the actual latency or capacity of the communication network 1 can be determined reliably.

This process, too, can occur cyclically in as much as the checking of the actual capacity of the communication network 1 by sending out the data packets 10 is repeated at regular intervals.

In the current Ethernet AVB standard, there is no transport protocol which provides the possibility of determining and distributing the current capacity of the network. In the case of a rejection of a reservation request 4, the only remaining possibility is of sending out a new request 4 with a special emergency flag which can interrupt other datastreams. This leads to an inefficient utilization of the available resources.

By the method described in accordance with the invention, the network resources can be utilized better because the free capacities of the communication network 1 are determined. It is advantageous that the implementation of the novel method does not require a new transport protocol and this is compatible with the previous standard.

The sender can now respond flexibly to the rejection 7 of a reservation request 8 for capacity determination and adapt the reservation request 4 in such a manner that the data can be transmitted in real time as much as possible. In addition, the possibility exists to validate the guaranteed resources. This opens up the possibility of checking the network quality and achieving corresponding error handling for example by changing the quality of service classes (AVB classes). From the measured latency time, any conclusion with respect to the current network capacities can also be used with regard to the transmission period. This is particularly advantageous especially within the context of mobile networks and networks having a fluctuating available data rate.

By the results of the validation, the quality of service parameters can also be adapted retrospectively for datastreams already existing. If it is noticed by a running diagnosis of the delay that the behavior of the networks is changing negatively, it is thus possible to respond early and to displace existing or new datastreams into a higher class of quality of service in order to prevent possible errors before these lead to faults in the applications.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting data in a packet-oriented communication network having a guaranteed maximum transmission time for data packets in the communications network, comprising:
   determining the capacity of the communication network using a reservation request for determining the capacity of the communication network at least one of:
      cyclically prior to a real reservation request,
      after a rejection,
      and at predefinable time intervals,
   wherein the reservation request for determining the capacity of the communication network is sent with an identifier that identifies the reservation request as a request for determining the capacity such that a real reservation request has priority over the reservation request for determining the capacity of the communication network;
   reserving a specific quality of service as a capacity of a communication link prior to a data transmission by a real reservation request from a sender of data to a receiver of the data;
   at least one of:
      guaranteeing a requested quality of service as a capacity of the communication link between the sender and the receiver in the network for a datastream by confirmation of the real reservation request or
      providing an indication in the form of a rejection that transmission is not possible;
   sending a datastream from a sender to a receiver, the contents of which are the data packets having a time entry which comprises a sum of a current time on sending the data packet plus a predeterminable time interval;
   comparing, in the receiver, the sum with the time entry;
   sending an error message by the receiver if the processing time is after the time entry in time.

2. The method as claimed in claim 1, wherein the capacity of the communication network is determined by sending out at least one reservation request for determining the capacity of the communication network having a selected capacity.

3. The method as claimed in claim 2, wherein each reservation request for determining the capacity of the communication network is sent out with different selected capacities until there is a confirmation of the reservation request, values of the selected capacities being reduced after reception of a rejection.

4. The method as claimed in claim 2, wherein the reservation request for determining the capacity of the communication network is retracted after receiving a confirmation.

5. The method as claimed in claim 1, wherein the reservation request of the sender is based at least in part on the determined capacity of the communication network.

6. The method as claimed in claim 1, wherein the datastream having a number of data packets is sent out and the predefinable time interval is varied.

7. The method as claimed in claim 1, wherein the communications network, is a communications network of a motor vehicle.

8. The method as claimed in claim 1, wherein the identifier is a flag in a header of the data packets that specifies a lowest priority possible.

9. A user terminal in a communication network, comprising:
   a transmitting/receiving device; and
   a computing unit configured to perform a communication in the communication network in accordance with a communication protocol,
   wherein the computing unit is configured to execute program code to:
   determine the capacity of the communication network using a reservation request for determining the capacity of the communication network at least one of:
      cyclically prior to a real reservation request,
      after a rejection, and
      at predefinable time intervals,
   wherein the reservation request for determining the capacity of the communication network is sent with an identifier that identifies the reservation request as a request for determining the capacity such that a real reservation request has priority over the reservation request for determining the capacity of the communication network;
   reserve a specific quality of service as a capacity of a communication link prior to a data transmission by a real reservation request from a sender of data to a receiver of the data;
   at least one of:
      guarantee a requested quality of service as a capacity of the communication link between the sender and the receiver in the network for a datastream by confirmation of the real reservation request or
      provide an indication in the form of a rejection that transmission is not possible;
   sending a datastream from a sender to a receiver, the contents of which are the data packets having a time entry which comprises a sum of a current time on sending the data packet plus a predeterminable time interval;
   comparing, in the receiver, the sum with the time entry; and
   sending an error message by the receiver if the processing time is after the time entry in time.

10. The user terminal of claim 9, wherein the user terminal is one of the sender, the receiver, and a switch of the communication network.

11. A nontransitory computer readable media comprising program code suitable for configuring, when executed on a computing unit, causing the computing unit to:
   determine the capacity of the communication network using a reservation request for determining the capacity of the communication network at least one of:
      cyclically prior to a real reservation request,
      after a rejection, and
      at predefinable time intervals,
   wherein the reservation request for determining the capacity of the communication network is sent with an identifier that identifies the reservation request as a request for determining the capacity such that a real reservation request has priority over the reservation request for determining the capacity of the communication network;
   reserve a specific quality of service as a capacity of a communication link prior to a data transmission by a real reservation request from a sender of data to a receiver of the data;

at least one of:
  guarantee a requested quality of service as a capacity of the communication link between the sender and the receiver in the network for a datastream by confirmation of the real reservation request or
  provide an indication in the form of a rejection that transmission is not possible;
sending a datastream from a sender to a receiver, the contents of which are the data packets having a time entry which comprises a sum of a current time on sending the data packet plus a predeterminable time interval;
comparing, in the receiver, the sum with the time entry; and
sending an error message by the receiver if the processing time is after the time entry in time.

* * * * *